United States Patent

Matsukawa et al.

[11] Patent Number: 5,554,831
[45] Date of Patent: Sep. 10, 1996

[54] SOUND ABSORBING MEMBER

[75] Inventors: Hiroshi Matsukawa, Tokyo; Kyoichi Watanabe; Hiroshi Sugawara, both of Yokosuka, all of Japan

[73] Assignees: Mitsubishi Kasei Corporation, Tokyo; Nissan Motor Co., Ltd., Kanagawa Pref., both of Japan

[21] Appl. No.: 312,063

[22] Filed: Sep. 26, 1994

[30] Foreign Application Priority Data

Sep. 27, 1993 [JP] Japan .................................. 5-239822

[51] Int. Cl.$^6$ ...................................................... E04B 1/84
[52] U.S. Cl. ........................... 181/294; 181/286; 428/219; 428/224; 428/284; 428/287
[58] Field of Search ...................................... 181/286, 290, 181/294; 428/224, 284, 287, 219

[56] References Cited

U.S. PATENT DOCUMENTS

| | | | |
|---|---|---|---|
| 4,420,526 | 12/1983 | Schilling et al. | 181/294 X |
| 5,064,714 | 11/1991 | Yamaguchi et al. | 428/224 X |
| 5,258,585 | 11/1993 | Juriga | 181/286 |
| 5,286,929 | 2/1994 | Kazawa et al. | 181/286 |

FOREIGN PATENT DOCUMENTS

| | | |
|---|---|---|
| 237665A1 | 9/1987 | European Pat. Off. . |
| 584445A1 | 8/1992 | Germany . |
| 2262947 | 7/1993 | United Kingdom . |

OTHER PUBLICATIONS

"Determination of Carboxyl End Groups in a Polyester, Polyethylene Terephthalate", Herbert POHL, vol. 26, No. 10, Oct. 1954, pp. 1614–1616.

Primary Examiner—Khanh Dang
Attorney, Agent, or Firm—Lowe, Price, LeBlanc & Becker

[57] ABSTRACT

A sound absorbing member having excellent sound insulating and absorbing performances comprises a fiber assembly consisting essentially of short fibers and having a thickness of not less than 5 mm, in which new and/or recycled polyester fibers are used as the short fiber and not less than 30% by weight of the polyester fiber used have a fiber-size of not more than 4 denier.

6 Claims, 1 Drawing Sheet

SOUND ABSORBING MEMBER

BACKGROUND OF THE INVENTION

1. Field of the Invention

This invention relates to a sound absorbing member comprised of a cheap sound insulation structural body having high performances, and more particularly to a sound absorbing member having improved sound absorbing performance, sound insulating performance and economical efficiency and a high contribution to social welfare by positively utilizing recycled polyethylene terephthalate (PET) materials.

The sound absorbing members according to the invention are particularly suitable as an interior sound absorbing member for automobile such as floor insulator, dash insulator arranged on a dash panel and the like.

2. Description of the Related Art

The invention will be described with respect to the dash insulator for the automobile used under severe restricting conditions among the sound absorbing members below. As shown in FIG. 1, the conventional dash insulator 2 locates on a surface of a dash panel 1 dividing an engine room E and a compartment R, and is provided with a sound insulating layer 3 and a sound absorbing layer 4, and serves to prevent transmission of noise from the engine room E to the compartment R.

As shown in FIG. 2, the dash insulator 2 arranged on the dash panel 1 is generally a multilayer structural body of the sound insulating layer 3 having a relatively high surface density such as polyvinyl chloride sheet, rubber sheet or the like incorporating a filler therein and the sound absorbing layer 4 of a porous material such as felt, polyurethane foam, nonwoven fabric or the like.

In the conventional dash insulator, noise from the engine room E is absorbed by the sound absorbing layer 4, while good soundproof performance is developed by a double sound insulating effect through the dash panel 1 and the sound insulating layer 3.

Recently, it has been confirmed that the sound insulating performance of the dash insulator largely changes in accordance with the adhesion to the dash panel 1. As a result, there are mainly used dash insulators in which a molded sound absorbing member exactly fitting to a surface shape of the dash panel is used as the sound absorbing layer 4. For example, fibrous sound absorbing members are manufactured by adding a resin binder to chemical fibers or natural fibers and shaping and pressing them under heating. As the resin binder, use may be made of thermoplastic resins such as polyethylene resin, polypropylene resin, polyester resin and the like or thermosetting resins such as phenolic resin and the like.

In this connection, U.S. Pat. No. 5,064,714 discloses an internal trim member for automobile in which a fiber assembly in the member is mainly formed by a filling method wherein fibers are blown in a mold together with air. In this method, however, the fibers do not easily come into details of the mold, so that it is required to use thick fibers (6–8 denier) having a relatively heavy weight for attaining complete filling. On the contrary, the use of fine fibers having a size of not more than 4 denier is required for giving high sound absorbing performances to the internal trim member, but these fine fibers are poor in the dispersibility and are unapplicable for the above method because the productivity and the sound absorbing performances can not simultaneously be established. Particularly, not less than 30% by weight of fibers having a size of not more than 4 denier, preferably not more than 2 denier should be included in the internal trim member for satisfying the sound absorbing performances, which is not attained by this method.

In the sound absorbing layer 4 for the conventional dash insulator, the felt or the like comprised of natural fibers is mainly used, so that the scattering of fineness is very large to bring about the ununiformity of sound insulating performance and hence it is difficult to constantly hold such a performance as a product.

Furthermore, the sound absorbing layer has the drawbacks that (i) the sound absorbing performance is poor because a great amount of fibers having a thick denier are existent, (ii) the sound absorbing performance is low in proportion to weight owing to the use of the resin binder, and the like.

SUMMARY OF THE INVENTION

Under the above circumstances, it is an object of the invention to provide a sound absorbing member comprised of a light and economical sound insulating structural body in which a fiber assembly is formed from polyester fibers, preferably recycled polyester fibers to provide sound absorbing performances of uniform quality based on the uniform fiber assembly having a regular fiber size.

The use of the recycled polyester material in the invention is preferable in view of contribution to social welfare through recycling and economical efficiency. That is, a market of recycled PET material is about 40,000 tons per year in the year of 1990 in Japan, which is mainly reused in carpet, bedding cotton and the like. However, the full amount of the recycled PET material is not always reused and 5,000 tons per year thereof is disused at the present.

Recently, the recovery of PET bottles is started and is active socially because the PET bottles have been produced in an amount of 120,000 tons per year in the year of 1990 and substantially disused up to the present. The recycle movement of the PET materials becomes more expanded from year to year and will extend to a recovery of 50% in the year of 2000. Moreover, the recycled PET material is specified as a second designated product according to a law of utilization promotion of recycled sources in 1993, so that the supply of the recycled PET material is considered to more increase in future. However, the reuse means of the recycled PET material is less at the present, so that the excessive supply can easily be expected in future.

The inventors effectively utilize the recycled PET material to develop members having high sound absorbing performances and largely contribute to social welfare by applying such members to automobiles and the like.

According to the invention, there is the provision of a sound absorbing member comprised of a fiber assembly consisting essentially of short fibers and having a thickness of not less than 5 mm, in which polyester fibers (hereinafter referred to as PET fiber) are used as the short fiber and not less than 30% by weight of the PET fiber used have a fiber size of not more than 4 denier.

BRIEF DESCRIPTION OF THE DRAWINGS

The invention will be described with reference to the accompanying drawings, wherein.

DESCRIPTION OF THE PREFERRED EMBODIMENTS

Figure 1:
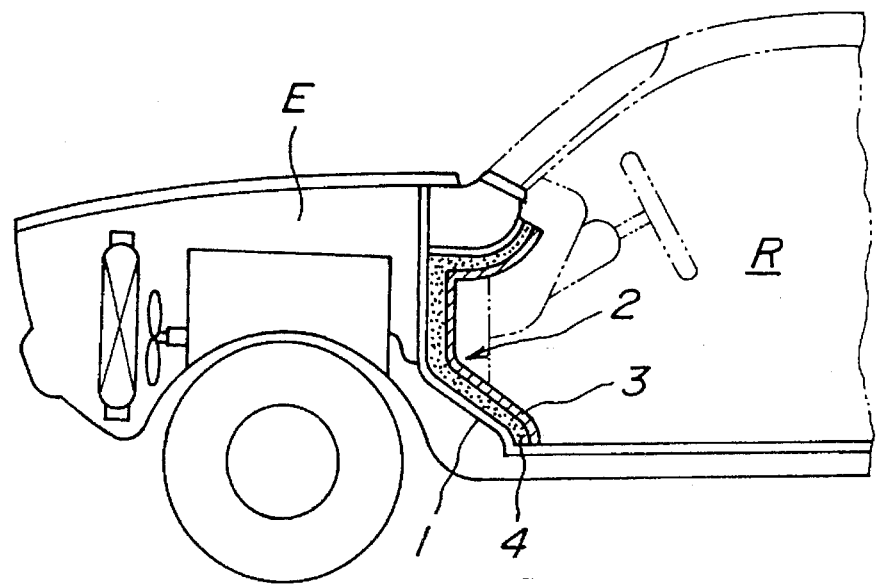
FIG. 1 is a partly sectional fragmentary schematic view illustrating an arrangement of a dash insulator between an engine room and a compartment i an automobile.
Figure 2:
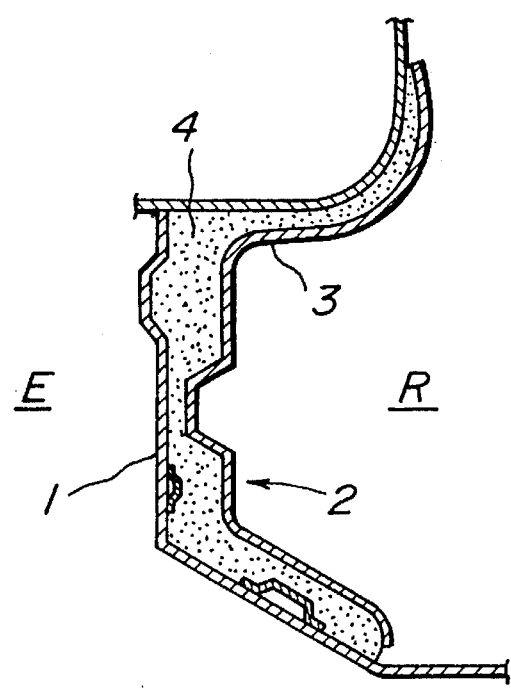
FIG. 2 is an enlarged section view of the dash insulator shown in FIG. 1.

When the sound absorbing member according to the invention is used as a dash insulator for an automobile located on a surface of a dash panel dividing an engine room and a compartment, the fiber assembly in the sound absorbing member is comprised of recycled polyester fibers, whereby the sound insulating performance and the economical efficiency are enhanced and the weight is reduced.

The sound insulating performance can be known by the measurement of vibration transmissibility and sound absorption coefficient. The vibration transmissibility shows what transmission of energy when a body vibrates by the energy. Therefore, the dash insulator is required to have a performance how vibrations do not transmit from the engine to the compartment. As a result of investigations on the improvement of such a performance by the fiber assembly, it has been confirmed that the performance is largely affected by the formulation of the fibers. The spring constant of the fiber assembly itself largely takes part in the vibration transmissibility. That is, the vibration transmissibility can be decreased by reducing the spring constant, whereby the sound insulating performance can be improved.

On the other hand, the spring constant is strongly interrelated to the fineness of the fiber. That is, the fiber assembly comprised of fibers having a fine fiber size has a relatively low spring constant. However, it is technically difficult to reduce the fiber size, which is a factor of increasing the cost from a viewpoint of economical reason and is disadvantageous in the forming step of nonwoven fabric. Thus in accordance with the present invention, a sound absorbing member is provided which is comprised of a fiber assembly consisting of polyester fibers containing 30–80% by weight of reclaimed polyester fibers in which not less than 30% by weight of the polyester fiber used have a fiber size of not more than 4 denier.

From a viewpoint of the performances of the fiber assembly, the fiber size is required to be not more than 4 denier. Considering the balance between the processability and the cost, thick fibers of more than 4 denier are required to be formulated in an amount of 70% by weight at maximum.

In order to obtain the satisfactory sound insulating performance, the spring constant is required to be not more than 80,000 N/m. When the spring constant exceeds the above value, the degree of transmitting vibrations becomes high and the sound insulating performance considerably lowers. As the value of the spring constant becomes small, the sound insulating performance is improved, so that the lower limit is not particularly restricted.

The fiber assembly is required to have a thickness of not less than 5 mm. When the thickness is less than 5 mm, the fiber assembly used in the sound absorbing member can not develop satisfactory performances. The upper limit of the thickness is determined by the weight and economical efficiency, but it is not critical.

Furthermore, the fiber assembly may be formulated with heat-fusible fibers having a melting point lower by at least 20° C. than that of the polyester fiber. As the heat-fusible fiber, use may be made of low-melting point polyester fiber, polyethylene fiber, polypropylene fiber and the like.

In the fiber assembly according to the invention, the short fibers having different finenesses may uniformly be dispersed, or the short fibers having the same fineness may locally be gathered to form a bulk or a sheet.

As compared with the fiber assembly of polyester fibers, the conventional felt contains about 60% by weight of fibers having a fiber size of not less than 6 denier, so that it can not be said that the felt is effective to reduce the vibration transmissibility.

According to the invention, it is necessary that the intrinsic viscosity of the recycled PET material is not less than 0.4 from a viewpoint of the processability at the spinning step. When the intrinsic viscosity is less than 0.4, if the spinning is carried out by using the recycled PET material, it is difficult to conduct the spinning due to the hanging down of PET melt at dies portion of the spinning apparatus and also yarn breakage is frequently generated and hence it is considerably difficult to form the fiber. On the other hand, the upper limit of the intrinsic viscosity is not particularly restricted.

Furthermore, the recycled PET material is required to have a carboxyl end groups of not more than $100 \times 10^{-6}$ equivalent/g from a viewpoint of the processability. When the amount of terminal carboxyl end groups exceeds the above value, if the recycled PET material is used to form the recycled PET fibers in an extrusion spinning machine, melt viscosity is largely decreased due to thermal decomposition and hence it is extremely difficult to conduct the PET melt to the nozzles of an extrusion spinning machine. In addition, yellow coloring is conspicuous in the resulting recycled PET fiber to degrade the appearance. Since the sound absorbing member is frequently used in the compartment, the appearance is a large factor in addition to the performances. Under the above circumstance, the upper limit of the carboxyl end groups is determined. On the other hand, the lower limit is not particularly restricted. Although the coloring generated when the amount of carboxyl end groups is within the above value does not come into problem in practical use, it may be avoided from a conspicuous place by using a surface coating member or by using the sound absorbing member in a secret place.

In general, it can be said that the sound insulating performance is improved as the sound absorption coefficient becomes high. However, as the surface density of the fiber assembly is increased, the weight and cost undesirably increase to degrade the economical efficiency of the sound absorbing member. Furthermore, as the surface density increases, the vibration transmissibility increases to lower the sound insulating performance. For this end, the surface density of the fiber assembly is favorable to be not more than 1.5 kg/m² considering the sound absorption, vibration transmissibility and weight. Preferably, the surface density is within a range of 0.6–1.2 kg/m².

As to the easy production of the fiber assembly, when using short fibers having a fine size, it is difficult to increase the carding rate to form the fiber assemblage at carding machine and a long time is taken for the formation of fiber assembly sheet and hence the efficiency is poor, which is a cause of increasing the cost. Further, the resulting fibers themselves become light and the settlement of the fiber assembly sheet is poor. Therefore, the use of fibers having a thick size becomes good from a viewpoint of the processability. For this purpose, fibers having a relatively thick size of not less than 6 denier is used in an amount of 5–70% by weight, preferably 10–30% by weight in the production of the fiber assembly.

The sound absorbing member according to the invention is applicable to various automobile parts such as dash insulator, floor carpet, head lining and the like and is useful for industrial materials.

According to the invention, industrial sound absorbing members having excellent sound absorbing and insulating performances and processability can be obtained by adjusting the fiber size and suppressing the scattering of fiber size and setting the surface density to a certain range. Furthermore, industrial sound absorbing members having high performances and economical efficiency can be provided by using the recycled polyester fibers as compared with the conventional members.

The following examples are given in illustration of the invention and are not intended as limitations thereof.

Reference Example 1

Recycled PET fibers having a fiber size of 2 denier are stably produced by using recycled PET having an intrinsic viscosity of 0.5 and spinning and drawing it at an extrusion temperature of 270° C. (drawing temperature: 70° C., drawing ratio: 4 times).

Reference Example 2

Recycled PET fibers having a fiber size of 3 denier are stably produced by using recycled PET having carboxyl end groups of $90 \times 10^{-6}$ equivalent/g and spinning and drawing it at an extrusion temperature of 270° C. (drawing temperature: 70° C., drawing ratio: 4 times).

EXAMPLE 1

A sound absorbing member No. 1 is produced by pressing a fiber assembly having a surface density of 0.8 kg/m$^2$ and a size of 300×300×30 mm, which consists of polyester fibers having a fineness of not more than 4 denier, an intrinsic viscosity of 0.5 and carboxyl end groups of $90 \times 10^{-6}$ equivalent/g, under a pressure of 50 kgf/cm$^2$ while heating at 165° C.

EXAMPLE 2

A sound absorbing member No. 2 is produced by pressing a fiber assembly having a surface density of 1.3 kg/m$^2$ and a size of 300×300×30 mm, which consists of polyester fibers having a fineness of not more than 4 denier, an intrinsic viscosity of 0.5 and carboxyl end groups of $90 \times 10^{-6}$ equivalent/g, under a pressure of 50 kgf/cm$^2$ while heating at 165° C.

EXAMPLE 3

A sound absorbing member No. 3 is produced by pressing a fiber assembly having a surface density of 1.5 kg/m$^2$ and a size of 300×300×30 mm, which consists of polyester fibers having a fineness of not more than 4 denier, an intrinsic viscosity of 0.5 and carboxyl end groups of $90 \times 10^{-6}$ equivalent/g, under a pressure of 50 kgf/cm$^2$ while heating at 165° C.

EXAMPLE 4

A sound absorbing member No. 4 is produced by pressing a fiber assembly having a surface density of 0.9 kg/m$^2$ and a size of 300×300×30 mm, which consists of 80% by weight of polyester fibers having a fineness of not more than 4 denier, an intrinsic viscosity of 0.5 and carboxyl end groups of $90 \times 10^{-6}$ equivalent/g, 15% by weight of polyester fibers having a fineness of 4–6 denier and 5% by weight of polyester fibers having a fineness of not less than 6 denier, under a pressure of 50 kgf/cm$^2$ while heating at 165° C.

EXAMPLE 5

A sound absorbing member No. 5 is produced by pressing a fiber assembly having a surface density of 1.0 kg/m$^2$ and a size of 300×300×30 mm, which consists of 80% by weight of polyester fibers having a fineness of not more than 4 denier, an intrinsic viscosity of 0.5 and carboxyl end groups of $90 \times 10^{-6}$ equivalent/g, 15% by weight of polyester fibers having a fineness of 4–6 denier and 5% by weight of polyester fibers having a fineness of not less than 6 denier, under a pressure of 50 kgf/cm$^2$ while heating at 165° C.

EXAMPLE 6

A sound absorbing member No. 6 is produced by pressing a fiber assembly having a surface density of 1.3 kg/m$^2$ and a size of 300×300×30 mm, which consists of 80% by weight of polyester fibers having a fineness of not more than 4 denier, an intrinsic viscosity of 0.5 and carboxyl end groups of $90 \times 10^{-6}$ equivalent/g, 15% by weight of polyester fibers having a fineness of 4–6 denier and 5% by weight of polyester fibers having a fineness of not less than 6 denier, under a pressure of 50 kgf/cm$^2$ while heating at 165° C.

EXAMPLE 7

A sound absorbing member No. 7 is produced by pressing a fiber assembly having a surface density of 0.8 kg/m$^2$ and a size of 300×300×30 mm, which consists of 60% by weight of polyester fibers having a fineness of not more than 4 denier, an intrinsic viscosity of 0.5 and carboxyl end groups of $90 \times 10^{-6}$ equivalent/g, 30% by weight of polyester fibers having a fineness of 4–6 denier and 10% by weight of polyester fibers having a fineness of not less than 6 denier, under a pressure of 50 kgf/cm$^2$ while heating at 165° C.

EXAMPLE 8

A sound absorbing member No. 8 is produced by pressing a fiber assembly having a surface density of 1.2 kg/m$^2$ and a size of 300×300×30 mm, which consists of 60% by weight of polyester fibers having a fineness of not more than 4 denier, an intrinsic viscosity of 0.5 and carboxyl end groups of $90 \times 10^{-6}$ equivalent/g, 30% by weight of polyester fibers having a fineness of 4–6 denier and 10% by weight of polyester fibers having a fineness of not less than 6 denier, under a pressure of 50 kgf/cm$^2$ while heating at 165° C.

EXAMPLE 9

A sound absorbing member No. 9 is produced by pressing a fiber assembly having a surface density of 1.4 kg/m$^2$ and a size of 300×300×30 mm, which consists of 60% by weight of polyester fibers having a fineness of not more than 4 denier, an intrinsic viscosity of 0.5 and carboxyl end groups of $90 \times 10^{-6}$ equivalent/g, 30% by weight of polyester fibers having a fineness of 4–6 denier and 10% by weight of polyester fibers having a fineness of not less than 6 denier, under a pressure of 50 kgf/cm$^2$ while heating at 165° C.

Reference Example 3

The same procedure as in Reference Example 1 is repeated by using recycled PET having an intrinsic viscosity of 0.35 and carboxyl end groups of $90 \times 10^{-6}$. In this case, however, yarn breakage is frequently caused at a dies portion of a spinning machine and hence good recycled PET fibers can not be obtained.

Reference Example 4

The same procedure as in Reference Example 2 is repeated by using recycled PET having an intrinsic viscosity of 0.5 and carboxyl end groups of $110 \times 10^{-6}$. In this case, however, the viscosity largely lowers due to thermal decomposition of the recycled PET in the extrusion spinning machine and the fiber size is largely scattered and hence good recycled PET fibers can not be obtained. Furthermore, the resulting recycled PET fibers are considerably colored (yellow).

Comparative Example 1

A sound absorbing member is produced by pressing a fiber assembly having a surface density of 1.0 kg/m² and a size of 300×300×30 mm, which consists of 20% by weight of polyester fibers having a fineness of not more than 4 denier, an intrinsic viscosity of 0.5 and carboxyl end groups of $90 \times 10^{-6}$ equivalent/g, 30% by weight of polyester fibers having a fineness of 4–6 denier and 50% by weight of polyester fibers having a fineness of not less than 6 denier, under a pressure of 50 kgf/cm² while heating at 165° C.

Conventional Example 1

A sound absorbing member is produced by heating a felt comprised of disentangled synthetic fibers and natural fibers and having a size of 300×300×30 mm and a surface density of 1.0 kg/m² at 200° C. and then pressing under a pressure of 50 kgf/cm².

Conventional Example 2

A sound absorbing member is produced by heating a felt comprised of disentangled synthetic fibers and natural fibers and having a size of 300×300×30 mm and a surface density of 1.2 kg/m² at 200° C. and then pressing under a pressure of 50 kgf/cm².

Conventional Example 3

A sound absorbing member is produced by heating a felt comprised of disentangled synthetic fibers and natural fibers and having a size of 300×300×30 mm and a surface density of 2.1 kg/m² at 200° C. and then pressing under a pressure of 50 kgf/cm².

Measurement

The intrinsic viscosity and carboxyl end groups are measured as follows.

Measuring method 1

The intrinsic viscosity is measured at 30° C. by dissolving 1 g of a polymer in 100 ml of a mixed solvent of phenol and tetrachloroethane of 1:1 (weight ratio).

Measuring method 2

The amount of carboxyl end groups is measured by a method described in Analytical Chemistry, 26 (10), 1614 (1954).

Test Example 1

The sound absorption coefficient is measured with respect to each sample of the sound absorbing members obtained in Examples 1–9, Comparative example 1 and Conventional examples 1–3 according to a test method for sound absorption of acoustical material by the tube method defined in JIS-A-1405. In this case, the size of the sample is 100 mm or 30 mm in diameter, and the frequency range to be measured is 100 Hz–6.4 kHz.

Test Example 2

The vibration transmissibility is measured with respect to each sample of the sound absorbing members obtained in Examples 1–9, Comparative Example 1 and Conventional Examples 1–3 by vibrating at a vibration force of 1.5N within a frequency range of 5–130 Hz. The spring constant (N/m) is calculated from the measured data.

Test Example 3

The sound transmission loss is measured with respect to each sample of the sound absorbing members obtained in Examples 1–9, Comparative Example 1 and Conventional Examples 1–3 according to a method for laboratory measurement of sound transmission loss defined in JIS-A-1416, from which a difference of average sound insulating level (dB) to Conventional Example 2 as a standard is calculated within a frequency range of 200 Hz–10 kHz.

The test results are shown in Table 1.

TABLE 1

| | A | B Fiber weight % of less than 4d | C Fiber weight % of 4–6d | D Fiber weight % of more than 6d | E Average fiber size d | F Surface Density kg/m² | G Intrinsic viscosity | H Carboxyl end groups (equivalent/g) |
|---|---|---|---|---|---|---|---|---|
| 1 | Example 1 | 100 | 0 | 0 | 4.00 | 0.80 | 0.5 | 0.00009 |
| 2 | Example 2 | 100 | 0 | 0 | 4.00 | 1.30 | 0.5 | 0.00009 |
| 3 | Example 3 | 100 | 0 | 0 | 4.00 | 1.60 | 0.5 | 0.00009 |
| 4 | Example 4 | 80 | 15 | 5 | 4.30 | 0.90 | 0.5 | 0.00009 |
| 5 | Example 5 | 80 | 15 | 5 | 4.30 | 1.00 | 0.5 | 0.00009 |
| 6 | Example 6 | 80 | 15 | 5 | 4.30 | 1.30 | 0.5 | 0.00009 |
| 7 | Example 7 | 60 | 30 | 10 | 4.50 | 0.80 | 0.5 | 0.00009 |
| 8 | Example 8 | 60 | 30 | 10 | 4.50 | 1.20 | 0.5 | 0.00009 |
| 9 | Example 9 | 60 | 30 | 10 | 4.50 | 1.40 | 0.5 | 0.00009 |
| 10 | Comparative Example 1 | 20 | 30 | 50 | 5.30 | 1.00 | 0.5 | 0.00009 |
| 11 | Conventional Example 1 | — | — | — | — | 1.00 | — | — |
| 12 | Conventional Example 2 | — | — | — | — | 1.20 | — | — |
| 13 | Conventional Example 3 | — | — | — | — | 2.10 | — | — |

TABLE 1-continued

| | A | I Spring constant N/m | J Sound absorption coefficient (500 Hz) | K Sound absorption coefficient (1 k Hz) | L Sound transmission loss (dB) 200–10 kHz average | M sound insulating performance | N Evaluation economical efficiency | O total |
|---|---|---|---|---|---|---|---|---|
| 1 | Example 1 | 56200 | 0.21 | 0.43 | 0.56 | o | Δ | o |
| 2 | Example 2 | 60000 | 0.30 | 0.62 | 1.34 | ⊚ | Δ | o |
| 3 | Example 3 | 67600 | 0.32 | 0.68 | 1.63 | ⊚ | Δ | o |
| 4 | Example 4 | 53500 | 0.26 | 0.56 | 0.86 | o | o | o |
| 5 | Example 5 | 61200 | 0.26 | 0.57 | 0.93 | o | o | o |
| 6 | Example 6 | 73600 | 0.28 | 0.63 | 1.21 | ⊚ | o | ⊚ |
| 7 | Example 7 | 54800 | 0.20 | 0.40 | 0.70 | o | o | o |
| 8 | Example 8 | 72500 | 0.25 | 0.54 | 1.00 | o | o | o |
| 9 | Example 9 | 72600 | 0.26 | 0.58 | 1.14 | ⊚ | o | ⊚ |
| 10 | Comparative Example 1 | 80100 | 0.20 | 0.44 | −0.15 | x | o | Δ |
| 11 | Conventional Example 1 | 84900 | 0.20 | 0.45 | −0.20 | x | Δ | x |
| 12 | Conventional Example 2 | 92100 | 0.21 | 0.46 | standard 0.00 | standard | Δ | x |
| 13 | Conventional Example 3 | 242000 | 0.26 | 0.50 | 0.20 | Δ | x | x |

As seen from Table 1, the sound absorbing members according to the invention are low in the spring constant and high in the sound absorption coefficient as compared with the conventional ones, from which the sound insulating performance is suggested to be high as compared with the conventional one. On the other hand, satisfactory values of the performances can not be obtained in Comparative Example 1 prepared by the specification outside the scope of the invention.

As mentioned above, the sound absorbing member according to the invention is constructed with the fiber assembly of new polyester fibers or recycled polyester fibers having a regulated fineness, so that it maintains sound insulating and absorbing performances higher than those of the conventional felt and is low in the cost and high in the economical efficiency. Furthermore, when the recycled polyester fibers are used in the fiber assembly, the resulting sound absorbing member can be applied to a field not utilizing the recycled product, so that the contribution to social welfare is considerably high.

What is claimed is:

1. A sound absorbing member for an automobile comprised of a fiber assembly consisting essentially of short fibers and having a thickness of not less than 5 mm, in which the fibers corresponding to not less than 30% by weight of the fiber assembly are recycled polyester fibers produced from a recycled polyester material having an intrinsic viscosity of not less than 0.4, and not less than 30% by weight of the fiber assembly have a fiber size of not more than 4 denier.

2. A sound absorbing member for an automobile comprised of a fiber assembly consisting essentially of short fibers and having a thickness of not less than 5 mm, in which the fibers corresponding to not less than 30% by weight of the fiber assembly are recycled polyester fibers produced from a recycled polyester material having carboxyl end group of not more than $100 \times 10^{-6}$ equivalent/g, and not less than 30% by weight of the fiber assembly have a fiber size of not more than 4 denier.

3. A sound absorbing member for an automobile comprised of a fiber assembly consisting essentially of short fibers and having a thickness of not less than 5 mm, in which the fibers corresponding to not less than 30% by weight of the fiber assembly are recycled polyester fibers produced from a recycled polyester material having an intrinsic viscosity of not less than 0.4 and carboxyl end group of not more than $100 \times 10^{-6}$ equivalent/g, and not less than 30% by weight of the fiber assembly have a fiber size of not more than 4 denier.

4. A sound absorbing member for an automobile according to anyone of claims 1–3 wherein 5–70% by weight of the fiber assembly have a fiber size of not less than 6 denier.

5. A sound absorbing member for an automobile according to anyone of claims 1–3, wherein the fiber assembly has a surface density of not more than 1.5 kg/cm$^2$.

6. A sound absorbing member for an automobile according to anyone of claims 1–3, wherein the fiber assembly has a spring constant of not more than 80,000 N/m.

* * * * *